Figure 1:
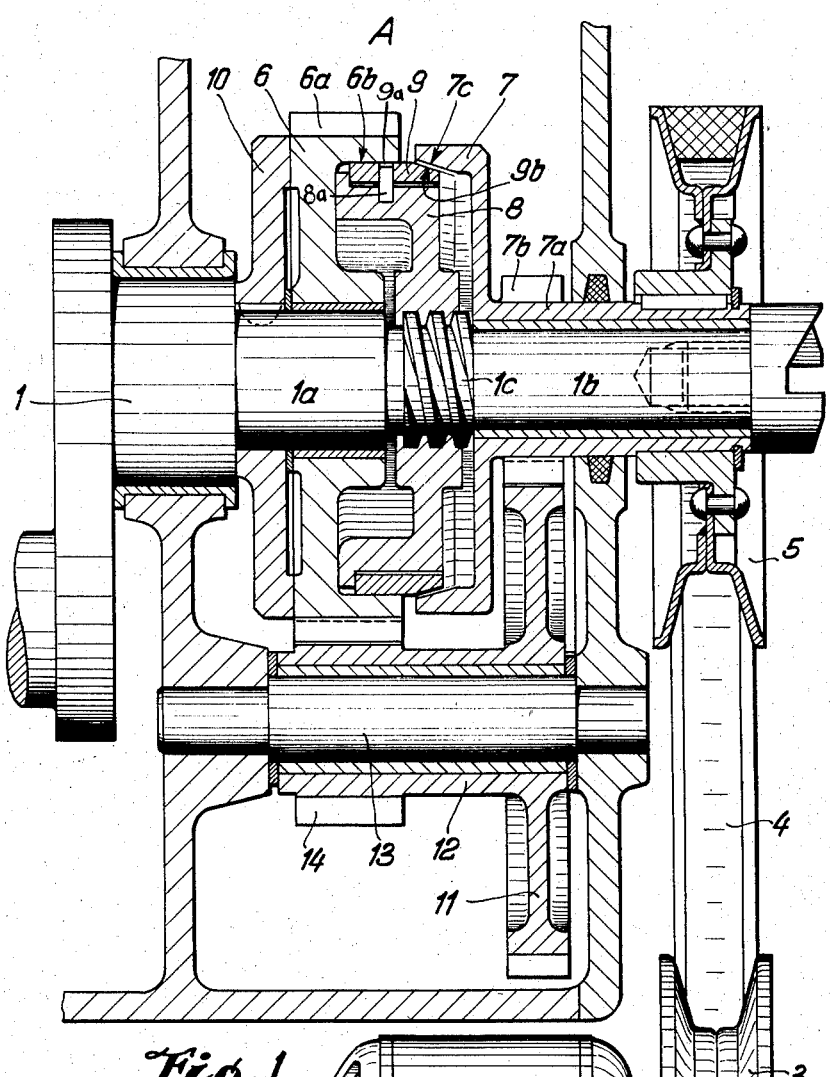

May 19, 1959 — H. PAPST — 2,886,987

MOTOR-GENERATOR-STARTER DRIVE UNIT

Filed March 22, 1954

Inventor:
Hermann Papst
By
Barnes, Kisselle, Laughlin & Raisch
Attorneys

United States Patent Office 2,886,987
Patented May 19, 1959

2,886,987

MOTOR-GENERATOR-STARTER DRIVE UNIT

Hermann Papst, St. Georgen, Black Forest, Germany

Application March 22, 1954, Serial No. 417,777

Claims priority, application Germany March 27, 1953

2 Claims. (Cl. 74—810)

This invention relates to clutch gear of the type adapted to connect an internal combustion engine with an electric machine which, for the purpose of starting the internal combustion engine, acts as a starter motor via a reduction gearing, whereas at increased speed of the internal combustion engine it acts as a generator. It is already known to provide such clutch gears with a clutch nut which acts in opposite directions and effects the automatic reversing of the driving connection between the internal combustion engine and the electric machine.

The electrical equipment of an internal combustion engine may be greatly simplified by the use of clutch gears of the type mentioned above, since only one electric machine is required for starting and for the generation of electric power. Due to the fact that a reduction gearing is used when the electric machine is working as a starter, the torque of the electric machine operating as an electric motor may be kept relatively small. The clutch gear itself is of relatively small dimensions, so that the space requirements of the entire assembly may be kept down, assuring at the same time an easily surveyable arrangement and good accessibility of all parts. It is of particular importance that the use of a clutch gear excludes the possibility of erroneous or accidental operation of the starter, due to the fact that renewed operation of the switch controlling the electric starter, after the starting of the internal combustion engine, cannot cause any damage.

It is an object of the invention to render the automatic shifting of the clutch gear particularly reliable. More specifically, it is an object of the invention to improve the alternative engagement of the clutch nut of the gear.

The characteristic feature of the invention resides in the fact that the clutch nut of the gear is provided with a resilient expander ring which together with a gearing disc associated with the internal combustion engine forms a friction clutch for the transmission of the starter drive, and together with a gearing disc associated with the electric machine constitutes a second friction clutch establishing driving connection between internal combustion engine and electric generator. It is to be recommended to make the co-operating surfaces of this second friction clutch of conical shape and to arrange them in such a manner that upon engagement of the clutch the expander ring of the clutch nut is withdrawn from the gearing disc associated with the internal combustion engine. The expander ring of the clutch nut may be constructed in many different forms. It has, however, been found very convenient to construct the expander ring as an open or slotted spring ring which has the tendency to expand.

The invention will now be described in more detail in connection with an illustrative embodiment given by way of example only, and with reference to the accompanying drawing in which Fig. 1 is a view of the clutch apparatus in axial section.

Figure 2:
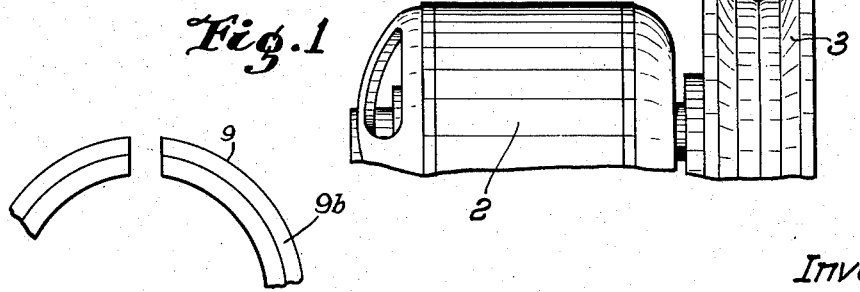

Fig. 2 is a fragmentary end view of the expander ring employed therein.

The crankshaft 1 of an internal combustion machine (not shown) is adapted to be drivingly connected with an electric machine 2 via a belt pulley 3, a belt 4, a second belt pulley 5, and gearing A in such a manner, that the electric machine 2 may be used as a starter motor for starting the internal combustion engine, and at increased speed of the latter serves as a generator.

The gearing A is mounted on an extension of the crankshaft 1, which consists of two stepped portions 1a and 1b, between which is provided a steep pitch thread 1c. The gearing comprises a gearing disc 6, which may be considered as the output gear, associated with the internal combustion engine; a gearing disc 7, which may be considered as the input gear, associated with the electric machine 2; and a clutch nut 8 carrying an axially split expander-type ring 9 which has the tendency to expand resiliently in an outward direction. Ring 9 is mounted on nut 8 by means of a pin 8a fixed on nut 8 which projects radially into an opening 9a in ring 9.

The gearing disk 6 is mounted freely rotatable on the shaft portion 1a, and is adapted to form a friction clutch together with the disk 10 which is rigidly mounted on the shaft portion 1a. On its periphery the gearing disk 6 is provided with teeth 6a. The gearing disc 7 is mounted freely rotatable on the portion 1b of the crankshaft and through a hub portion 7a is connected with a belt pulley 5, so as to be rotationally fast therewith. The hub portion 7a of the gearing disc 7 is formed as a pinion gear provided with teeth 7b. The clutch nut 8 which is arranged between the two gearing discs 6 and 7, is in engagement with the steep pitch thread 1c, by means of which the axial displacements required for the switching action are imparted to it. In the drawing, the clutch nut 8 is shown in its extreme left-hand position, so that the ring 9 is able to expand and comes to bear against the cylindrical surface 6b of the gearing disc 6. The co-operating surfaces 7c and 9b of the gearing disc 7 and the expander ring 9, respectively, are of conical shape and enter into engagement with each other, when the clutch nut 8 is displaced towards the right. Thereby the expander ring 9 is contracted, and consequently is withdrawn from the surface 6b of gearing disc 6.

A pinion 14 meshes with the teeth of the gearing disc 6, while a gear 11 is associated with the toothing 7b of the gearing disc 7. The pinion 14 and the gear 11 are arranged on a common hub 12 and are rotatably supported on the countershaft 13.

The gearing according to the invention operates as follows:

When the internal combustion engine is to be started, the electric machine 2 which is now connected to act as a motor, is put into operation and imparts a rotary motion to the gearing disc 6 via the belt drive 4, 3, 5, the toothing 7b, the countershaft assembly 11–14, and the toothing 6a. The disc 6, through the intermediary of expander ring 9, imparts a rotary drive to the clutch nut 8 which, due to its engagement with the steep pitch thread 1c, is displaced axially towards the left, pressing the gearing disc 6 against the disc 10, so that the discs 6 and 10 enter into frictional engagement and a rotary drive is imparted to the crankshaft 1. The reduction provided by the countershaft assembly is so chosen, that during idling of the internal combustion engine the clutch nut 8 remains in the position shown in the drawing without, however, being able to exert strong axial pressure on the gearing disc 6.

Upon acceleration of the internal combustion engine above idling speed the steep pitch thread 1c effects displacement of the clutch nut 8 towards the right, so that the ring 9 and the gearing disc 7 enter into engagement with their conical surface 9b, respectively 7c, whereby the ring 9 due to its contraction is withdrawn from surface 6b of gearing disc 6. Rotation of the crankshaft 1 is consequently transmitted to the electric machine 2 via gearing disc 7 and belt drive 3–5, the electric machine having meanwhile been switched to operate as a generator and being now able to produce electric current.

I claim:

1. A clutch apparatus for providing a driving connection between the rotor of an electric motor and an internal combustion engine to start the same and thereafter form a driving connection between the engine and the rotor so that the electric motor serves as a generator comprising a rotatable shaft having a driving connection with the crank shaft of the engine and having a quick-action thread formed thereon, a reduction gearing having an input gear arranged to be driven by the rotor of the electric motor and an output gear mounted to rotate freely on said rotatable shaft, said rotatable shaft having a clutch disc fixed thereon and said output gear having a clutch portion engageable with said clutch disc to rotate therewith when the output gear is shifted axially on said rotatable shaft towards said clutch disc, said output gear having a recess thereon forming a substantially cylindrical friction surface concentric with said shaft, a nut threadedly engaged with said quick-action thread and arranged adjacent said output gear, said nut having around the outer surface thereof a friction member normally biased in a radially outward direction, means connecting said friction member with said nut to rotate therewith, said friction member having an outer generally cylindrical friction surface portion which, in one axial position of said nut, engages said substantially cylindrical friction surface on the output gear and shifts the output gear axially towards said clutch disc to transmit rotation of the output gear to said rotatable shaft and thereby rotate the shaft and start the engine, said input gear comprising a pinion gear mounted to rotate freely on said rotatable shaft and located on the opposite side of said nut from said output gear, said pinion gear having a clutch member mounted thereon for rotation therewith, said clutch member having a recess therein forming an inwardly directed, generally conically shaped friction surface concentric with said shaft, said friction member on said nut having a second outer surface portion extending axially from said first mentioned surface portion and forming an outer generally conically shaped friction surface complementary to the conically shaped friction surface of said clutch member, said conical friction surface of said friction member being engageable with the conical friction surface of said clutch member when the nut is shifted axially on said quick-action thread toward said clutch member to overcome the radial bias on said friction member and thereby contract the same and disengage the friction surface thereof from the generally cylindrical friction surface of the output gear to thereby engage the nut with said clutch member and form a driving connection between the engine and the rotor of the electric motor.

2. An apparatus according to claim 1 characterized in that said friction member comprises an axially split expander-type ring.

References Cited in the file of this patent

UNITED STATES PATENTS

| 1,165,967 | Halbleib | Dec. 28, 1915 |
| 1,603,798 | Pilkington | Oct. 19, 1926 |
| 2,466,427 | Hoover | Apr. 5, 1949 |
| 2,466,461 | Mauric et al. | Apr. 5, 1949 |